(12) United States Patent
Alekseev et al.

(10) Patent No.: US 11,225,599 B2
(45) Date of Patent: Jan. 18, 2022

(54) FIBER SURFACE FINISHING

(71) Applicant: SCHLUMBERGER, TECHNOLOGY CORPORATION, Sugar Land, TX (US)

(72) Inventors: Alexey Vladimirovich Alekseev, Novosibirsk (RU); Irina Alexandrovna Lomovskaya, Novosibirsk (RU); Anastasia Evgenyevna Shalagina, Koltsovo (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 161 days.

(21) Appl. No.: 16/310,475

(22) PCT Filed: Jun. 22, 2016

(86) PCT No.: PCT/RU2016/000379
§ 371 (c)(1),
(2) Date: Dec. 17, 2018

(87) PCT Pub. No.: WO2017/222406
PCT Pub. Date: Dec. 28, 2017

(65) Prior Publication Data
US 2020/0308476 A1 Oct. 1, 2020

(51) Int. Cl.
*E21B 43/267* (2006.01)
*C09K 8/70* (2006.01)
(Continued)

(52) U.S. Cl.
CPC ............ *C09K 8/70* (2013.01); *C09K 8/426* (2013.01); *C09K 8/80* (2013.01); *E21B 33/138* (2013.01);
(Continued)

(58) Field of Classification Search
None
See application file for complete search history.

(56) References Cited

U.S. PATENT DOCUMENTS

| 4,379,870 A | 4/1983 | Matsumoto |
| 4,822,451 A | 4/1989 | Ouderkirk et al. |

(Continued)

FOREIGN PATENT DOCUMENTS

| EP | 0093007 A2 | 11/1983 |
| EP | 0093007 A3 | 9/1984 |

(Continued)

OTHER PUBLICATIONS

International Search Report and Written Opinion issued in International Patent Application No. PCT/RU2016/000379 dated Mar. 23, 2017; 7 pages.

(Continued)

*Primary Examiner* — Andrew Sue-Ako

(57) ABSTRACT

Embodiments disclosed herein relate to a fluid for use in well treatment having a carrier fluid and a plurality of altered fiber particles having a plurality of defects on a surface of the fiber particles. The fluid may be used for a method of fracturing a subterranean formation. The method includes injecting a fracturing fluid into a wellbore through the subterranean formation, thereby creating a fracture network in the subterranean formation, the fracturing fluid comprising a proppant and a plurality of fibers having a plurality of defects on a surface of the fibers.

7 Claims, 11 Drawing Sheets

(51) Int. Cl.
*C09K 8/42* (2006.01)
*C09K 8/80* (2006.01)
*E21B 33/138* (2006.01)

(52) U.S. Cl.
CPC ........ *E21B 43/267* (2013.01); *C09K 2208/08* (2013.01)

(56) References Cited

U.S. PATENT DOCUMENTS

| | | | |
|---|---|---|---|
| 4,879,176 A | 11/1989 | Ouderkirk et al. | |
| 4,880,971 A * | 11/1989 | Danisch | G01F 23/292 340/619 |
| 6,528,157 B1 * | 3/2003 | Hussain | C09K 8/805 428/325 |
| 8,163,826 B2 | 4/2012 | Willberg et al. | |
| 2004/0014608 A1 * | 1/2004 | Nguyen | C09K 8/706 507/200 |
| 2008/0023205 A1 * | 1/2008 | Craster | E21B 33/1208 166/387 |
| 2010/0323932 A1 * | 12/2010 | Bustos | C09K 8/32 507/219 |
| 2011/0245420 A1 | 10/2011 | Rasal et al. | |
| 2011/0319509 A1 | 12/2011 | Dorgan et al. | |
| 2015/0126414 A1 * | 5/2015 | Abe | C09K 8/12 507/117 |
| 2015/0330197 A1 * | 11/2015 | Brannon | C09K 8/72 166/300 |
| 2016/0122618 A1 | 5/2016 | Nguyen et al. | |
| 2017/0283683 A1 * | 10/2017 | Sheldon | C09K 8/508 |

FOREIGN PATENT DOCUMENTS

| | | |
|---|---|---|
| EP | 2338670 A1 | 6/2011 |
| EP | 2537964 A1 | 12/2012 |
| WO | 2009079231 A2 | 6/2009 |
| WO | 2014033233 A1 | 3/2014 |
| WO | 2014042552 A1 | 3/2014 |
| WO | 2016085710 A1 | 6/2016 |

OTHER PUBLICATIONS

Erik Miller, Jonathan P. Rothstein. "Control of the sharkskin instability in the extrusion of polymer melts using induced temperature gradients" // Rheol Acta (2004) 44:160-173.

* cited by examiner

FIBER SURFACE FINISHING

BACKGROUND

Hydrocarbons (oil, natural gas, etc.) are obtained from a subterranean geologic formation (i.e., a "reservoir") by drilling a well that penetrates the hydrocarbon-bearing formation. The well provides a partial flowpath for the hydrocarbon to reach the surface. Production of the hydrocarbons which involves travel of the hydrocarbons from the formation to the wellbore (and ultimately to the surface), occurs when a sufficiently unimpeded flowpath from the formation to the wellbore is present.

Hydraulic fracturing, also referred to as fracking, is a primary tool for improving well productivity by creating or extending fractures or channels from the wellbore to the reservoir. Pumping of propping granules, or proppants, during the hydraulic fracturing of oil and gas containing earth formations may enhance the hydrocarbon production capabilities of the earth formation.

Solids, such as fibers, may be introduced into a flow that is pumped into a well for a number of different reasons. For example, fibers may be mixed with a proppant and a carrier fluid in a hydraulic fracturing operation for purposes of preventing settling of the proppant. Moreover, the fibers may create a more uniform distribution of the proppant over the fractures.

Fibers may be used in other oilfield applications, such as applications in which the fibers are mixed with cement or as lost-circulation material. For example, in a well cementing operation, the fibers may contribute to the strength of the cement and enhance the rigidity and stress tolerance of the cement.

Fibers may also be combined with a gelling agent with or without other solids for purposes of fluid diversion. In this regard, a combined fiber and gelling agent mixture may be used to treat selected regions of a well to prevent/control fluid loss in the regions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a fluid for use in well treatment having a carrier fluid and a plurality of altered fiber particles having a plurality of defects on a surface of the fiber particles.

In another aspect, embodiments of the present disclosure relate to a method for fracturing a subterranean formation, the method including injecting a fracturing fluid into a wellbore through the subterranean formation, thereby creating a fracture network in the subterranean formation, the fracturing fluid comprising a proppant and a plurality of fibers having a plurality of defects on a surface of the fibers.

In another aspect, embodiments of the present disclosure relate to a method of well treatment, the method as follows: a) injecting a slurry comprising a fibrous material, the fibrous material is present in the slurry as a dispersed material; b) allowing the fibrous material to form a plug in one or more than one of a perforation, a fracture, and a wellbore in a well penetrating formation; and c) performing a downhole operation. The fibrous material has a plurality of defects on a surface of the fibrous material.

Other aspects and advantages of the claimed subject matter will be apparent from the following description and the appended claims.

DETAILED DESCRIPTION

Generally, embodiments disclosed herein relate to fibers and well treatment methods of using the same, such as but not limited to fluid diversion and preventing proppant settling. More specifically, embodiments disclosed herein relate to well treatment fluids formed of a carrier fluid and a plurality of fibers having increased surface friction dispersed in the carrier fluid that may prevent proppant settling and ensure efficient proppant placement in a created fracture or may ensure fluid diversion to maximize contact to reservoir and well productivity. The surface friction of the fibers may be increased by altering the fiber surface.

In a fracturing method for a subterranean formation, a first stage referred to as the "pad stage" involves injecting a fracturing fluid into a wellbore at a sufficiently high flow rate that creates a hydraulic fracture in the formation. The pad stage is pumped until the fracture is of sufficient dimensions to accommodate the subsequent slurries pumped in the proppant stages. After the "pad stage", several stages referred to as "proppant stages" or "propped stages" are injected into the formation, in which solid proppant particles are suspended in the fluid. While conventional fracturing techniques may include the continuous introduction of proppants (shown in FIGS. 1-2 below), embodiments also include the periodic introduction of proppants (shown in FIGS. 3-4).

Figure 1:
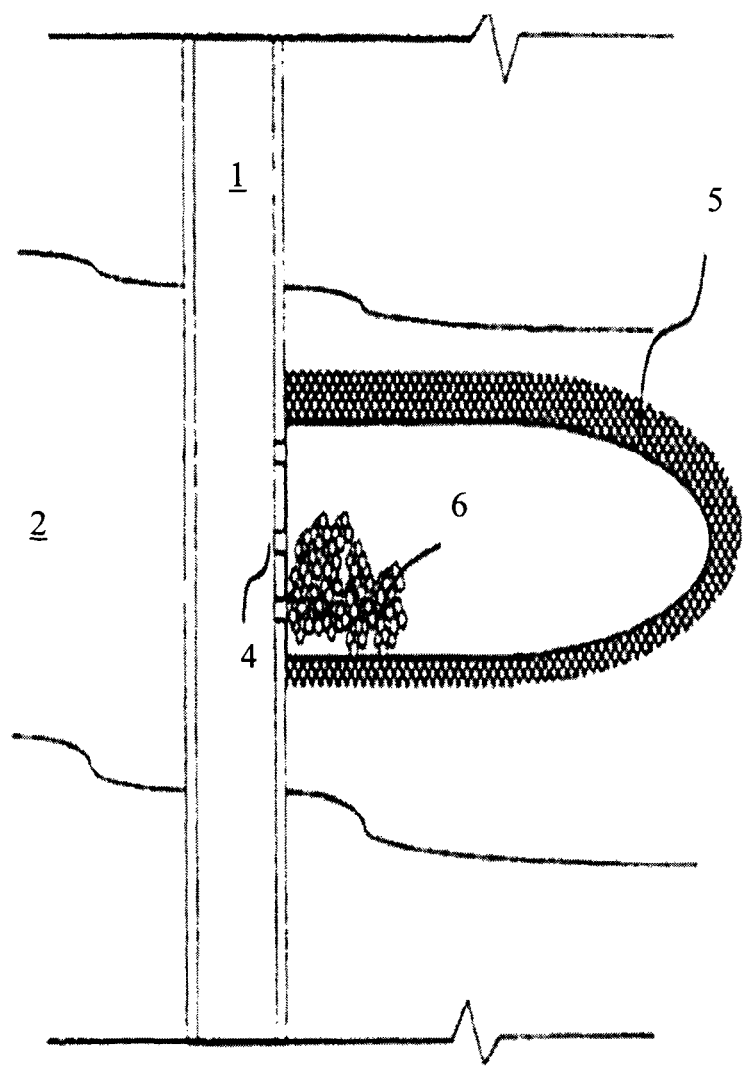
FIGS. 1 and 2 show the proppant distribution following a fracturing treatment.
Figure 2:
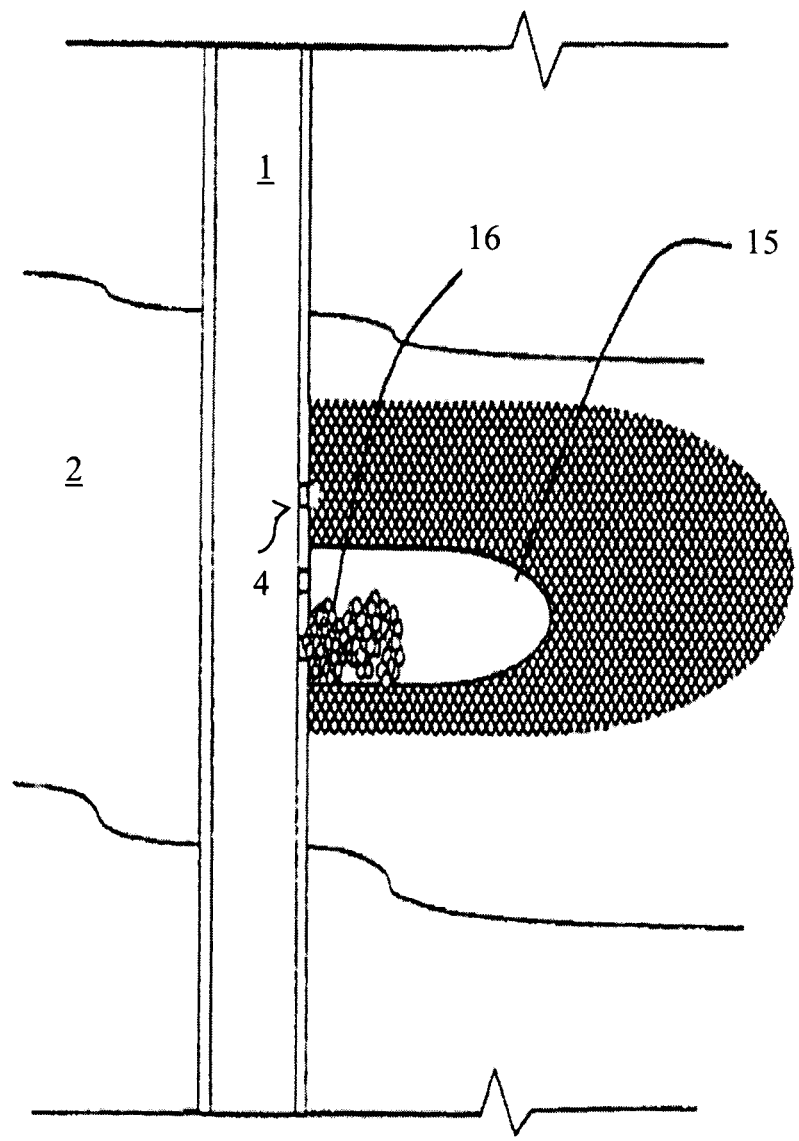

As shown in FIG. 1, hydraulic fracturing injects a fluid (such as a viscous carrier fluid) (not shown), a portion of which may contain suspended proppant, into a wellbore 1 penetrating an oil and gas bearing earth formation 2 and forcing the fracturing fluid through perforations 4 against the formation strata by pressure, which results in the creation or growth of a fracture network (not shown) within the earth formation 2. The fracture 5 serves as conduits for the flow of hydrocarbons trapped within the formation 2 to the wellbore 1. To keep the fractures 5 open and capable of supporting the flow of hydrocarbons to the wellbore 1, proppants 6 are delivered to the fracture 5 within the formation by a carrier fluid and fill the fracture 5 with a proppant pack (such as 16 as seen in FIG. 2) that is strong enough to resist closure of the fracture 5 from to formation pressure and is also permeable for the flow of the fluids within the formation. After the proppant is placed in the fractures, the pressure is released, and the fracture 5 is allowed to shrink (or close) with the formation of fracture 15 as shown in FIG. 2, whereby conductive proppant packs (such as 16 as seen in FIG. 2) are formed in the fractures through which formation fluids can be produced at sufficiently high rates.

Figure 3:
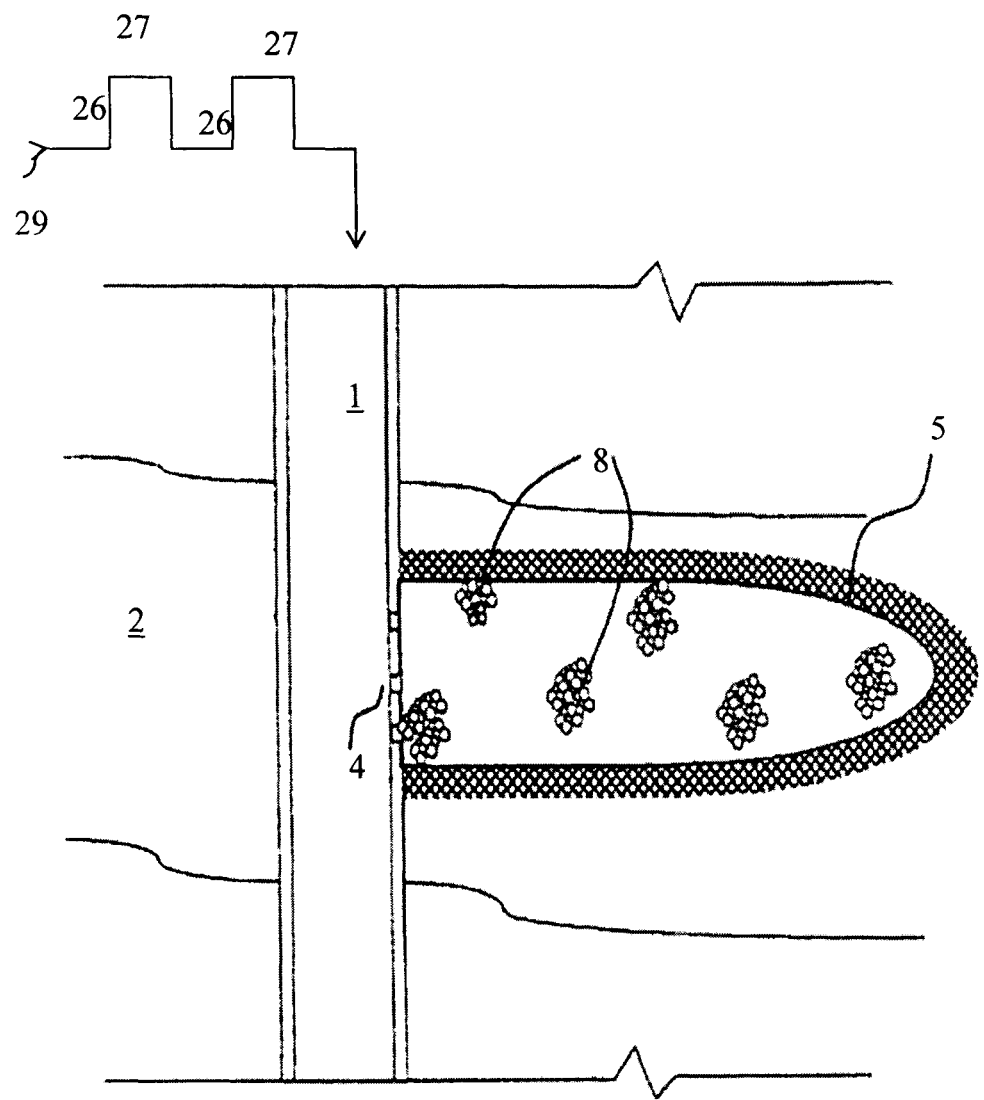
FIGS. 3 and 4 show the proppant distribution as a result of alternating proppant fluid-stage.

Referring now to FIG. 3, a heterogeneous proppant placement in a fracture is shown. As seen in FIG. 3, a wellbore 1 can be completed with perforations 4 in the formation 2. Proppant materials may be intermittently injected into the same fracturing fluid 29 through the wellbore 1 into a fracture 5. The fracturing fluid has sufficient viscosity to suspend the proppants during injection and heterogeneously place them in bundles of proppant or proppant cluster 8 spread along the fracture. In one or more embodiments, the proppant clusters 8 may be separated by channelant-rich regions (not shown) which may be removed, after the fracture is allowed to close, by various methods such as flushing, dissolving, softening, melting, breaking, etc.

Figure 4:
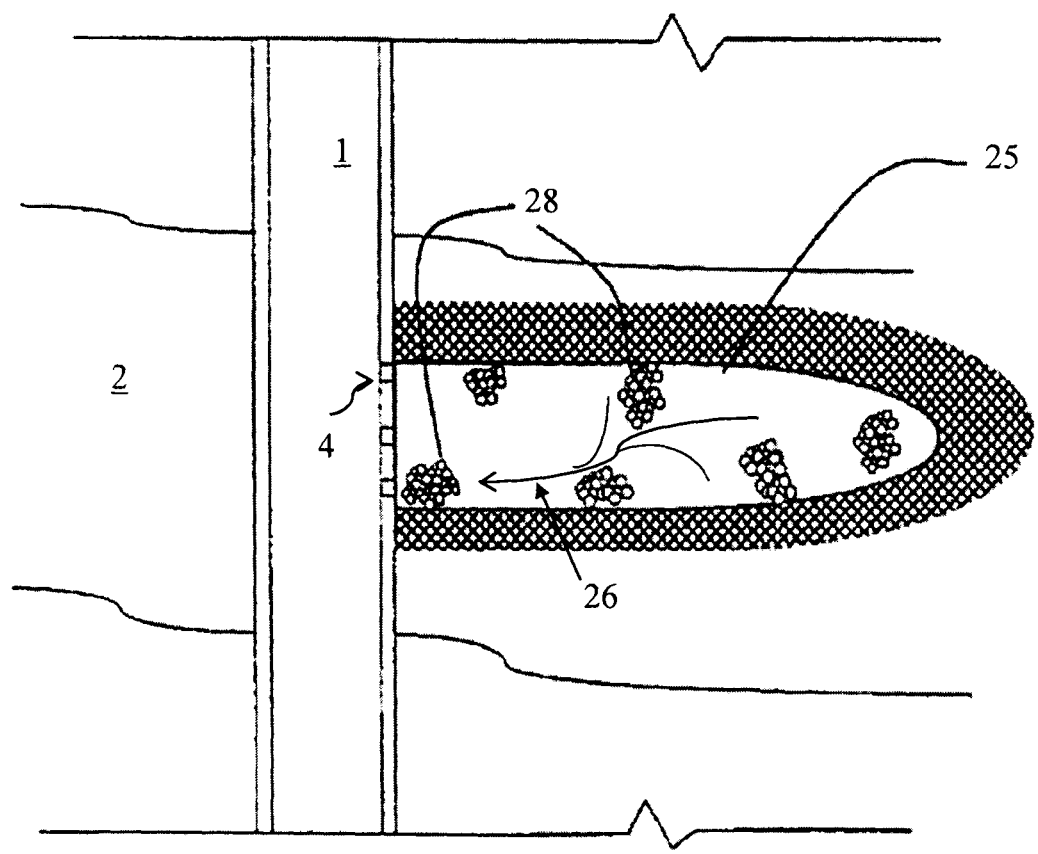

Referring still to FIG. 3, the clusters 8 of proppant are spread out along a large fraction of the fracture length. Upon closing of fracture 5, the proppant clusters 8 compress to form pillars 28 to support the fracture 25 (as shown in FIG. 4) and prevent the opposing fracture faces from contacting each other, creating higher overall conductivity and effective fracture half-length. As a result, when the pressure is released, the clusters 28 remain spread along the whole fracture and minimize the shrinkage of the fracture 25. Next, the formation fluid may be allowed to invade (not shown) the fracture 5 to displace any channelant, or any unconsolidated proppant or other particles from the proppant-lean regions. A network of interconnected open channels 26 can thus be formed around the pillars 28 to provide the fracture 25 with high conductivity for fluid flow. The fluid systems can be alternated many times to achieve varied distribution of the clusters in the hydraulic fracture. By sequentially injecting into the wellbore alternate stages of fracturing fluids having a contrast in their ability to transport propping agents to improve proppant placement, or having a contrast in the presence or amount of transported propping agents, the well productivity is increased.

The general concept of "pulse fracturing" will now be described. In such embodiments, a proppant stage 29 (as shown in FIG. 3) involves the periodical introduction of proppants into the fracturing fluid to form a suspension. Thus, the propped stage may be divided into two periodically repeated sub-stages, the "carrier sub-stage" or the "clean pulse" 26 that involves injection of fracturing fluid without proppant, and the "propping sub-stage" or the "dirty pulse" 27 that involves addition of proppant into the fracturing fluid. As a result of the periodic slugging of slurry containing proppant, the proppant does not completely fill the fracture. Rather, spaced proppant clusters 28 (as shown in FIG. 4) form as posts or pillars with channels 26 between them for fluids to pass between the pillars. The volumes of dirty pulse 27 and clean pulse 26 as pumped may be different, or may change over time.

Upon release of the pumping pressure, the proppant materials used in the fracturing fluid may remain in the fractures, holding the separated rock faces in an open position and forming a channel for flow of formation fluids back to the wellbore. However, if the proppant pack includes or develops voids or channels due to proppant settling, proppant flowback with produced fluids may take place. Proppant flowback typically occurs instantly during well cleanup or over a period of several days to weeks or months after the fracturing treatment, but it can also start anytime during the economic life of the well. Proppant flowback often leads to poor fracture conductivity in the near wellbore zone. This is caused by the reduction in the fracture width which limits the production from the entire fracture. Proppant flowback may also have a detrimental effect on the production equipment leading to plugging or erosion of the surface equipment which results in loss of revenue during downtime when equipment is replaced.

Thus, the fracturing methods of the present disclosure involve the use of fibers having increased surface friction to improve proppant transport, reinforce the proppant pack and to prevent, minimize, or reduce the proppant flowback due to proppant settling. Further, the fibers of the present disclosure may also be used in diversion treatments without proppants. According to the present disclosure, the fracturing treatment may be performed for example as described above in FIG. 1-2 or 3-4. Specifically, according to the present embodiments, a fracturing fluid including a proppant and a plurality of polymer fibers having increased surface friction may be injected into a wellbore through the subterranean formation to create a fracture network in the subterranean formation. The fractures into which the plurality of polymer fibers having increased surface friction are injected may have been opened by a prior fracturing fluid that is injected at a sufficient rate and pressure into the wellbore to initiate and/or propagate at least one fracture in the subterranean formation. However, it is within the scope of the present disclosure that the present fluid containing the polymer fibers having increased surface friction is used at such stage as well. The proppant and the plurality of polymer fibers having increased surface friction are suspended in a portion of the fracturing fluid, so that the proppant and the polymer fibers having increased surface friction are placed in the formed fracture in a subterranean zone, while maintaining the fracture open. Thereafter, the fracturing fluid flow and pressure exerted on the fractured subterranean zone are terminated whereby the fractures are allowed to close on the proppant and polymer fibers. The polymer fibers having increased surface friction entrap the proppant particles, facilitating the formation of permeable proppant packs. The suspension of the proppant and polymer fibers having increased surface friction in the fracturing fluid may be accomplished by utilizing conventional batch mixing techniques to mix and suspend the proppant and the polymer fiber having increased surface friction. It is also envisioned that the polymer fibers having increased surface friction may be added into the fracturing fluid on-the-fly, right before the injection of the slurry into the well. It is also envisioned that the polymer may be added into the fracturing fluid on-the-fly, right before the injection of the slurry into the well with the surface friction of the fibers being increased in-situ.

As noted above, the pumping of the fracturing fluid may be performed at a constant pumping rate or by pumping with pulses (such as described in FIGS. 3 and 4 above). In embodiments where the fracturing fluid is pumped with pulses, the dirty pulse 27 may include a slurry containing proppant and a plurality of polymer fibers having increased surface friction while the clean pulse 26 may contain the fracturing fluid (free of proppants and polymer fibers). In such embodiments, the polymer fibers having increased surface friction may be included in the fracturing fluid 29 at the beginning, middle and/or the end of a dirty pulse 27. It is also envisioned that both the clean pulse and dirty pulse may contain fibers having increased surface friction in differing concentrations, materials, etc. to differentiate between the two at the end of the fracturing job.

According to various embodiments, the proppant particles and the plurality of fibers having increased surface friction are dispersed in a carrier fluid, which may provide a uniform distribution of the proppant in the wellbore zone. Upon placement in the fracture and under downhole temperatures, the fibers having increased surface friction form a 3D fiber network that holds the proppant in place thereby limiting further proppant flowback with the fluid production, while allowing the formation fluids to flow. The fibers having increased surface friction act to bridge across constrictions and orifices in the proppant pack, and they serve to stabilize the proppant pack with no or minimal effect on proppant conductivity.

Further, the fibers having increased surface friction may allow for a uniform distribution of proppant throughout the fracture height, which may provide for a uniform distribution of stress on a proppant pack upon closure of the fracture, thereby fixing and immobilizing the proppant in the fracture.

It is also envisioned that the fibers having increased surface friction of the present disclosure may be used for carrying out other subterranean treatments, including, but not limited to, diverting treatments and zonal isolation treatments.

As noted above, the fibers having increased surface friction of the present disclosure may be incorporated in slurries used for zonal isolation and/or treatment diversion. Zonal isolation and treatment redirection or diversion are based on treatment redirection because of plugging of the stimulation zone with various solids. According to various embodiments, the slurries of the present disclosure may enable zonal isolation by creating plugs in the proximity of the wellbore.

Slurries of the present disclosure may form a plug upon being injected into a wellbore. After treatment, the created plugs are removed. There are several methods that may be applied for removal of such plugs, such as degradation, chemical treatment, melting, or disintegration of the sealer into smaller pieces that will be flushed away. It is also envisioned that plug removal may be achieved through physical dissolution of at least one of the components of the diverting blend in the surrounding fluid. It is envisioned that the fibers of the present disclosure may be degraded, dissolved, etc. Solubility of the plug may depend on temperature. In this situation, post-treatment temperature recovery in the sealed zone may trigger the removal of the plug. A list of possible materials that may possess disintegration include plastics such as PLA, polyamides and composite materials comprising degradable plastics and non-degradable fine solids. Further, some of the degradable material passes the disintegration stage during the degradation process. For example, PLA may turn into fragile materials before its complete degradation.

According to the present embodiments, the carrier fluid may be any water based fluid phase. In one or more embodiments, the aqueous carrier fluid forms the continuous phase of the fluid and may be selected from: fresh water, sea water, brines, mixtures of water or brine and water soluble organic compounds and mixtures thereof. In those embodiments of the disclosure where the aqueous medium is a brine, the brine is water comprising an inorganic salt or organic salt. The salt may serve to provide a portion of the fluid's density (to balance against the formation pressures). In various embodiments of the wellbore fluid disclosed herein, the brine may include seawater, aqueous solutions where the salt concentration is less than that of sea water, or aqueous solutions where the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, nitrates, oxides, sulfates, silicates, phosphates and fluorides. Salts that may be incorporated in a brine include any one or more of those present in natural seawater or any other organic or inorganic dissolved salts.

The carrier fluid may optionally further comprise additional additives, including, but not limited to, acids, fluid loss control additives, gas, corrosion inhibitors, scale inhibitors, catalysts, clay control agents, biocides, friction reducers, combinations thereof and the like. Further, while many diversion treatments may use an aqueous fluid as a base fluid, the present disclosure is not so limited and it is also envisioned that an oleaginous fluid alone or in combination with an aqueous fluid (as an emulsion) may also be used as the base fluid with the pre-processed fiber flocks of the present disclosure.

According to embodiments of the present disclosure, hydraulic fracturing fluids or other wellbore fluids of the present disclosure may be aqueous solutions containing a thickener, such as a soluble polysaccharide, which may be included to provide sufficient viscosity to transport the proppant. Typical thickeners are polymers, such as guar (phytogeneous polysaccharide), and guar derivatives (hydropropyl guar, carboxymethylhydropropyl guar). Other polymers and other materials, such as xanthan, scleroglucan, cellulose derivatives, polyacrylamide and polyacrylate polymers and copolymers, viscoelastic surfactants, and the like, can be used also as thickeners. For example, water with guar represents a linear gel with a viscosity that increases with polymer concentration. Cross-linking agents are used which provide engagement between polymer chains to form sufficiently strong couplings that increase the gel viscosity and create visco-elasticity. Common crosslinking agents for guar include boron-, titanium-, zirconium-, and aluminum-laden chemical compounds.

Proppants may comprise naturally occurring sand grains or gravel, man-made or specially engineered proppants, such as fibers, resin-coated sand, or high-strength ceramic materials, e.g. sintered bauxite. The proppant collects heterogeneously or homogenously inside the fracture to "prop" open the new cracks or pores in the formation. The proppant creates planes of permeable conduits through which production fluids can flow to the wellbore. By selecting proppants having a contrast in one of such properties such as density, size and concentrations, different settling rates will be achieved. The fracturing fluids are of high viscosity, and therefore capable of carrying effective volumes of proppant material.

Fibers may be used as a proppant transport additive which is able to prevent rapid proppant settling. Due to bridging performance, fiber material may also be used in fluid diversion services to form a plug and divert fluid flow. In both proppant transport and diversion technologies, interaction of fiber-to-fiber plays a role. Such interaction may help create stable a fiber network capable to sustain proppant in suspended state. Furthermore, interaction between fiber and proppant may improve fracturing operations. For diversion operations, fibers may interact effectively with each other and with fracture walls to form a stable plug able to withstand differential pressure.

Fiber-to-fiber interaction may depend on friction between individual fibers which in turn depends on surface properties. The higher the surface friction, the higher the interaction between fibers is to be expected, and so, the more stable network structure is formed.

Friction between the fibers may be increased by altering the surface of the fibers by introducing surface defects. Such defects can be formed either during fiber production by varying manufacturing conditions using a spinneret with shaped cross-section, selecting certain spinning conditions or adding an additional step to the manufacturing line for the purpose to "scratch" the surface of a drawn fiber before the cutting step. In other embodiments, surface defects may be introduced post-treatment, and may be introduced either by physical processes or chemical processes. Examples of physical methods include, but are not limited to, ion bombardment, plasma, UV treatments, abrasive blasting, neutron irradiation. Examples of chemical methods include, but are not limited to, leaching, surface grafting, and ozone-gas treatment.

Surface alteration or surface finishing includes most types of etch pits, scratches, caverns, surface distortions, etc. In some embodiments of the disclosure, surface roughness may be the surface of the fiber having an average number ranging from about 10 defects per 1 mm of fiber length to about 300 defects per 1 mm of fiber length, about 50 defects per 1 mm of fiber length to about 250 defects per 1 mm of fiber length, or about 100 defects per 1 mm of fiber length to about 150 defects per 1 mm of fiber length. The alteration of the surface may be accomplished during manufacture of the fiber, during pre-treatment of the fiber prior to injection into the wellbore, during pumping of the well treatment fluid (including fiber), or in-situ.

The suitability of fibers for a particular end-use process may depend on many factors. Some of factors, such as tensile strength, elasticity or chemical resistance, depend on the properties and the chemical nature of the polymer from which the fibers are made. Other factors, such as surface tension, friction, or adhesion, depend on surface properties. A change in the nature of the surface may be performed by a variety of ways including, but not limited to, alteration of the surface chemistry (i.e., surface molecular weight, addition or alteration of functional chemical groups, incorporation of radicals, chemical species, polarity of the surface, etc.), surface energy, surface topography (i.e., surface roughness, micro- or nano-scale patterned or random surface patterns), surface crystallinity, incorporation of micro- or nano-scale materials in the sub-surface layer/layers (for example, micro- or nano-particulates or -fibers) or a combination thereof. A change of surface roughness may lead to an increase in fiber-fiber and fiber-proppant friction and thus improvement in proppant transport properties of the fiber or the fibers bridging ability.

Various fibers for use in embodiments of the present disclosure may include, for example, polylactic acid (PLA), polyglycolic acid (PGA), polyethylene terephthalate (PET), polyester, polyamide, polycaprolactam and polylactone, poly(butylene) succinate (PBS), polydioxanone, glass, ceramics, carbon (including carbon-based compounds), acrylic, polyethylene (PE), polypropylene (PP), polystyrene (PS), poly(methyl methacrylate (PMMA), novoloid resin, polyphenylene sulfide (PPS), polyvinyl chloride (PVC), polyvinylidene chloride (PVDC), polyurethane, polybenzimidazole, polyhydroquinone-diimidazopyridine, poly(p-phenylene-2,6-benzobisoxazole), cellulose, rayon, cotton, linen, hemp (or other natural fiber materials), cellulose acetate, rubber, sticky fiber, or a combination of two or more of the aforementioned materials.

In embodiments of the disclosure, the fibers of the present disclosure may be made of any material whose surface can be altered to increase surface tension. In some embodiments, the fibers may be degradable or non-degradable thermoplastic polymers or co-polymers or a combination thereof including most types of polyesters, polyolefin, polyamide or the like. Such fibers can have a variety of cross-sectional shapes ranging from simple round cross-sectional areas, oval cross-sectional areas, trilobal cross-sectional areas, star shaped cross-sectional areas, rectangular cross-sectional areas (ribbons) or the like.

In various embodiments, the fibers may contain one type of polymer. In some embodiments, a blend of two or more polymers or copolymers or the like may be used to prepare the polymer fibers of the present disclosure. Such fibers may have a variety of cross-sectional shapes ranging from simple round cross-sectional areas, oval cross-sectional areas, trilobal cross-sectional areas, star shaped cross-sectional areas, rectangular cross-sectional areas (ribbons) or the like.

In some embodiments, the fibers may be bi-component fibers with a core/sheath coaxial structure, a bi-component fiber with a side-by-side, segment pie, island-in-the-sea structure, or any other multi-component fiber configuration. As used herein, the term "islands in the sea" denotes a type of bicomponent or multicomponent fiber also described as multiple interface or filament-in-matrix. The "islands" are cores or fibrils of finite length, of one or more polymers imbedded in a "sea" (or matrix) of another polymer. The term "core/sheath" as used herein denotes a bi- or multi-component fiber of two polymer types or two or more variants of the same polymer. In a bi-component core/sheath fiber, one polymer forms a core and the other surrounds it as a sheath. Multicomponent core/sheath type fibers or two or more polymers can also be made, containing a core, one or more inner sheaths, and an outer sheath.

In a multi-component fiber configuration, the components may be a combination of degradable and non-degradable thermoplastic polymers or co-polymers or a combination thereof including polyesters, polyolefin, polyamides, polyaramides or the like.

According to various embodiments, the geometry (length and diameter) of the fibers disclosed herein are variables in preventing the proppant settling. The polymer fibers that have shown utility in the present disclosure have a diameter that may range from 6 to 100 microns and a length that may range from 1 mm to 60 mm, where the lower limit of the diameter can be any of 6 microns, 10 microns, 12 microns, 15 microns and the upper limit can be any of 18 microns, 35 microns, 45 microns and 60 microns, where any lower limit can be used with any upper limit. In such an embodiment, the lower limit of the fiber length may range from 1 mm, 4 mm, 6 mm, 10 mm, 15 mm and the upper limit can be any of 18 mm, 30 mm, 40 mm and 60 mm, where any lower limit can be used with any upper limit.

In embodiments of the disclosure, different polymers, different grades of one polymer or even different crystallinity (amorphous or crystalline state) of one grade polymer may have a different solubility or a different hydrolysis rate in organic solvents and in water-based alkali solutions. Combining different parameters such as crystallinity or molecular weight of one polymer or using two different polymers can provide a fiber with surface friction due to different sensitivities of the polymers to alkali or solvents (treatment fluids). The degree of surface friction degree may be achieved or controlled by changing an active component concentration (alkali or organic solvent) in the particular treatment fluid or by exposure time of the fiber to the treatment fluid.

In some embodiments, the polymer fibers may be manufactured to have an increased surface tension. A "shark skin" effect on the surface of the polymer fiber may appear if extrusion parameters of the polymer melt are not "optimal". In other embodiments, the surface may be altered by the die used in the extrusion process. The die may provide pits, scratches, caverns, or surface distortions during extrusion of the fiber.

In some embodiments, the fiber surface may be modified by mechanical manipulation, i.e., "scuffing up" the surface. In other embodiments, the fiber surface may be modified by an increase or decrease in temperature.

In some embodiments, the fibers may be treated with chemicals to "etch" or "rough up" the surface of the fiber to increase the surface tension of the fiber. In some embodiments, the chemicals may be mixed with the fibers to produce the altered fibers, the altered fibers will be introduced into the wellbore treatment fluid prior to pumping the fluid downhole. In other embodiments, the chemicals may be introduced into the wellbore treatment fluid after pumping of the wellbore fluid has begun, thus altering the surface of the fiber in-situ. The chemicals may also be introduced during the fiber-spinning process. According to embodiments of the disclosure, the fibers that are treated to alter their surface prior to being placed in wellbore treatment fluid, may or may not further chemically interact with components of the well treatment fluids. The altered fibers may be stable in the subterranean environment. Thus, in various embodiments, the fracturing fluids may include fibers that are soluble and/or degradable under downhole conditions.

The chemicals, which may be used to alter the fiber surface, may be an organic solvent or a water solution of strong bases. The organic solvent may be, but not limited to, acetone, ethyl acetate, butyl acetate, acetonitrile, benzene, toluene, glycol ether solvents such as diethylene glycol diethyl ether, diethylene glycol dimethyl ether, diethylene glycol dibutyl ether, diethylene glycol monomethyl ether, diethylene glycol monoethyl ether, diethylene glycol monobutyl ether, tri-ethylene glycol monomethyl ether, tri-ethylene glycol dimethyl ether, ethylene glycol diethyl ether, ethylene glycol monoethyl ether, ethylene glycol monobutyl ether, ethylene glycol dibutyl ether, and the like. Other solvents may include low molecular weight alcohols, various dibasic esters, esters of fatty acids such as isopropyl myristate, isopropyl oleate, rapeseed methyl esters, and the like. The strong base, for example, an alkali metal hydroxide. Examples include, but are not limited to, sodium hydroxide, potassium hydroxide, barium hydroxide, strontium hydroxide, calcium hydroxide, lithium hydroxide, magnesium hydroxide, rubidium hydroxide, caesium hydroxide or ammonium hydroxide or combinations thereof. However, these are non-limiting examples, and many other strong bases may be used such. In some embodiments, strong bases are those that have a pH of greater than about 10.

Due to their flexibility and geometry (length and diameter) the fibers can be easily pumped at any stage of a fracturing job with the existing pumping equipment and may provide the proper stability of the proppant pack. It is also envisioned that the fibers may be pumped in the last stage of a fracturing stage called "tail-in". The previous "proppant stages" may be pumped with proppant alone (conventional fracturing job) or together with degradable fibers. In such embodiments, the fibers may be, for example, polylactic acid (PLA) fibers or polyethylene terephthalate (PET) fibers; however, other fibers may be used as well. In embodiments where the fibers of the present disclosure are preceded by proppants pumped with fibers, the pumping of the proppant/fiber fluid may be performed at a constant pumping rate or by pumping with pulses (such as described in FIGS. 3-4 above). The "tail-in" stage may be pumped at a constant pumping rate to prevent "fracture pinching" at perforation. The "tail-in" stage (thus, the fluid having the polymer fibers of the present disclosure therein) may be pumped using a linear gel of slick water, but it may also be performed using a cross-linked gel or other carrier fluids. The concentration of proppant in the "tail-in" stage (with the fibers of the present disclosure) can vary from well to well, such as from 4 pounds of proppant added to one gallon of fluid (ppa) to 16 ppa or from 6 ppa to 8 ppa. In one or more embodiments, the concentration of the fibers of the present disclosure in the "tail-in" stage may be in the range 0.4-3% by weight of proppant (BWOP), where the lower limit can be any of 0.4, 0.6, 0.8 or 1.0% by weight of proppant, and the upper limit can be any of 1.0, 1.2, 1.25, 2.0, or 2.5% by weight of proppant, where any lower limit can be used with any upper limit.

According to various embodiments, the fibers may be mixed throughout the entire batch of proppant to be pumped during the stage or job. This may be accomplished by adding the fibers to the proppant before it is mixed with the fluid, adding the fibers to the fluid before it is mixed with the proppant or by adding the fibers dispersed in a carrier fluid at some other stage, before the slurry is pumped downhole. For example, as noted above, fibers may be pumped along with the proppant and the fracturing fluid in the form of a suspension at a "tail-in" stage. For example, such stage may be defined as the last 10-25% of the total amount of proppant that is pumped into the fracture as a "tail-in" to control flow back in the most economical manner or for other reasons. In one or more embodiments, so-called slugs of proppant and fibers and slugs of fibers alone may be pumped "tail-in" without pulses to obtain a continuous proppant pack. Without being bond by the theory, it is believed that the continuous proppant pack may work as a filter for fines such as small particles which are crashed proppant or unconsolidated formation rock. In such embodiments, the continuous proppant pack pumped in a "tail-in" fashion may pinch the fracture in the near wellbore area.

It is also envisioned that small slugs of the fracturing fluid including proppant and fibers may be pumped in between slugs of slurry of proppant or that small slugs of a slurry of fiber alone (without proppant) may be pumped between slugs of the proppant slurry. This could conceivably be used to control flow dynamics down the fracture, for example by providing more plug flow-like behavior. Pumping of small slugs of slurry of fiber as the "tail-in" is one example of this general procedure, which also and/or instead may be performed at a prior stage in the fracturing.

Further, as discussed above, in various embodiments, in the initial fracturing stages, a prior fracturing fluid that may include or be free of a proppant (and optionally free of the polymer fibers of the present disclosure) may be pumped in the wellbore within the formation of at least a fracture. In the later stages of the fracturing treatment, a fracturing fluid including proppant and fibers may be pumped continuously. It is also envisioned that a third slurry formulation, such as having proppant and a degradable fiber, may also be used between the initial fluid and the tail-in fluid that contains the fibers of the present disclosure. As noted above, embodiments of the present disclosure may involve the use of proppants in fracturing treatments when the proppant may be pumped continuously, or sequentially.

Another feature of the fibers is the reduction of the proppant settling rate (sedimentation). Due to the properties of the fibers to prevent sedimentation of the proppant, they may provide a uniform distribution of the proppant throughout the fracture height, which comes into play in a "tail-in" stage. Thus, a uniform distribution of stress on a proppant pack after fracture closure is provided, so the proppant in the fracture is fixed and immobilized.

Figure 11:
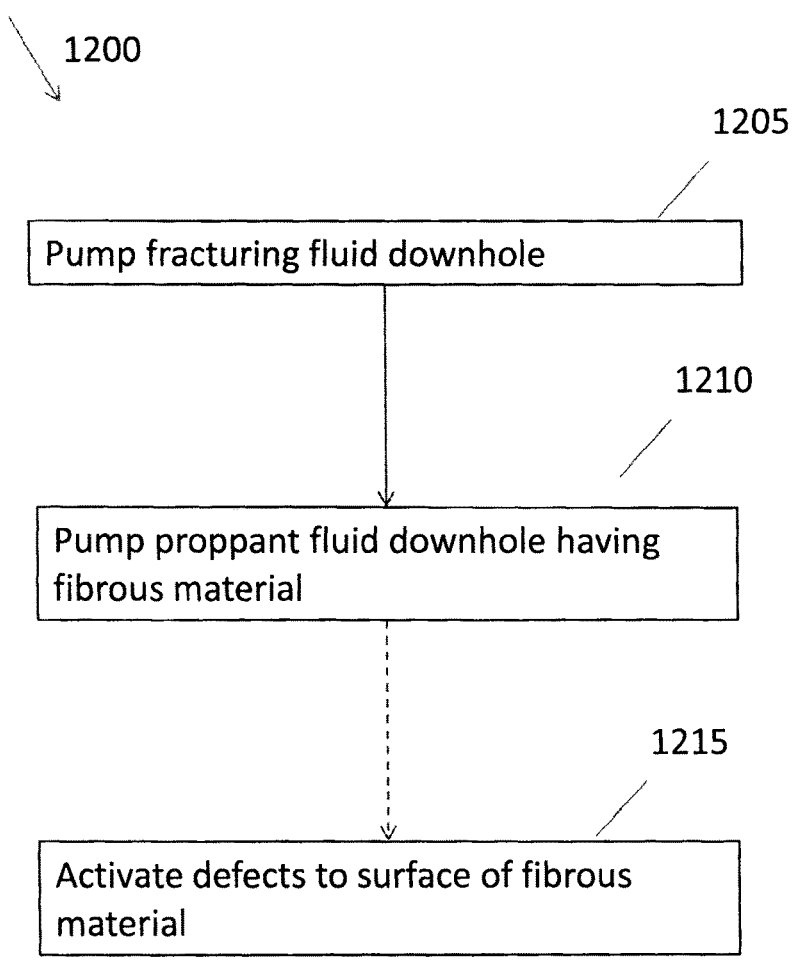
FIG. 11 is a flowchart for a method of hydraulic fracturing according to embodiments herein.

In some embodiments, the well treatment fluid including proppant material may be used during hydraulic fracturing of a subterranean formation. The hydraulic fracturing may stimulate oil reservoirs to allow oil and/or gas to flow properly. A method 1200 of hydraulic fracturing, as shown in FIG. 11, includes injecting fracturing fluids into the well bore 1205, at a rate sufficient to increase the pressure down hole to a value in excess of the fracture gradient of the formation thereby forming fractures. The pressure from the injection of the fracturing fluid may cause the formation rock to crack which allows the fracturing fluid to enter cracks and extend the cracks further into the formation. Once the fractures are formed, solid proppant materials along with fibrous material are added to further injections of the fracturing fluid in order to keep the fracture open. The fibrous material may be introduced into the fractures. When the fracturing pressures are removed the network of solid proppant particles and fibrous material present in the fractures prevent the fractures from closing. The fractures obtained and kept open with the solid proppant particles and fibrous material provide a permeable means through which the oil and/or gas can be extracted from the reservoir. The permeability of the proppant materials and fibrous material in the fracture enhances the flow of the reservoir fluids. Fibrous material may enhance the production of the reservoir. In some embodiments, a proppant fluid including fibrous material may be pumped downhole 1210. The fibrous material may have an altered surface to increase the surface tension of the fibrous material. In alternate embodiments, after placement within the fracture, the surface of the fibrous material may be altered by introducing defects onto the surface of the fibrous material via activation 1215. By placing the fibrous material downhole, the fibrous material having an increased surface roughness enters the fracture and forms a network such that an increase in the inflow of the reservoir fluid to the wellbore may be achieved. By pumping the fibrous material having an increased surface roughness within a well treatment fluid, typical pumping equipment may be used. The activation of the fibrous material in the proppant material may be achieved via a chemical reaction, a temperature differential, a pressure differential, or a combination thereof, and as noted above, may also occur on the surface before introduction into the wellbore.

EXAMPLES

The following examples are presented to further illustrate the preparation and properties of the wellbore fluids of the present disclosure and should not be construed to limit the scope of the disclosure, unless otherwise expressly indicated in the appended claims.

Example 1

Proppant settling is one of the parameters that may be used to determine the proppant transport additives. Proppant settling (S, %) vs. time was calculated according to equation (1):

$$S (\%) = (100 \cdot VCF)/(V_{initial} - V_{100}) \quad (1)$$

where VCF represents the volume of clear fluid above the slurry, $V_{initial}$ is the initial volume of the slurry, $V_{100}$ represents the volume occupied by the proppant at 100% settling (volume of dry proppant, 95 ml).

Proppant settling for several samples was tested as follows: 1.92 g of PLA fiber was mixed with 400 ml linear gel (with 5.4 g/L of guar loading) in a blender at 3000 rpm for 15 min. Next, 192 g of ceramic proppant CarboProp® 12/18 (available from Carbo Ceramics & Technologies, Houston, Tex.) was added and dispersed with a mixer at 1000 rpm for 2 min. The resultant slurry was placed into a 500 mL graduated cylinder. Afterwards, pictures were taken periodically. The fiber types being tested included a PLA fiber having an initial diameter of about 12 microns (PLA fiber 1) treated with NaOH at 4.8 g/L, PLA fiber 1 treated with NaOH at 2.4 g/L (PLA fiber 1), a comparative sample of untreated PLA fiber having an initial diameter of about 8-9 microns (PLA fiber 2) at 3 g/L, a comparative sample of untreated PLA fiber 2 at 3.6 g/L, and a comparative sample of untreated PLA fiber 1 having an initial diameter of about 12 microns at 2.4 g/L.

The PLA fiber 1 fibers were treated with 1.2 g/L NaOH solution for 10 minutes at 275° F. After, the fibers were properly washed with deionized (DI) water and air dried.

Figure 5A:
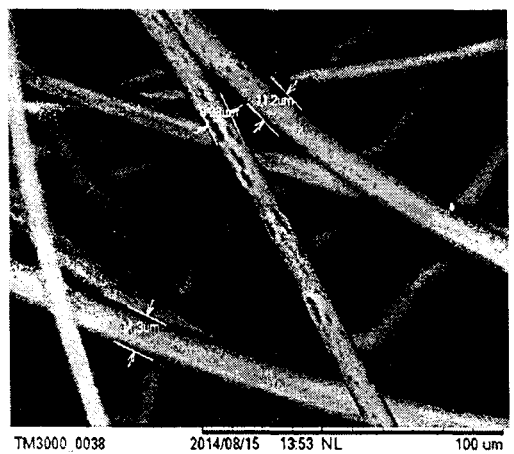
FIGS. 5A and 5B show scanning electron microscope (SEM) photographs of surface treated PLA fibers, according to the present embodiments.
Figure 5B:
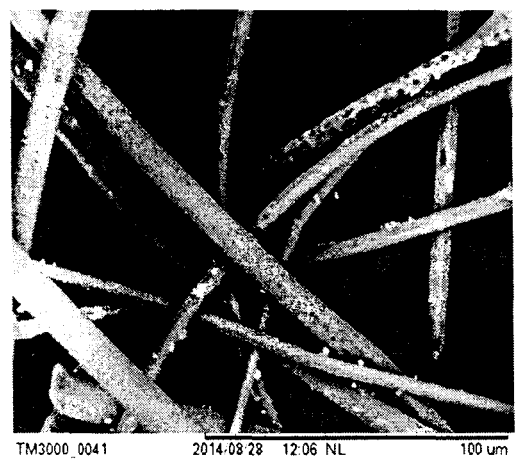

FIGS. 5A and 5B are scanning electron microscope (SEM) images showing surface defects on the fiber. FIG. 5A fibers were exposed to the NaOH solution for 30 minutes at a temperature of about 250 ° F. and FIG. 5B fibers were exposed to the NaOH solution for 10 minutes at a temperature of about 275° F. As noted, different loadings of treated PLA fiber, 4.8 g and 2.4 g per liter of carrier fluid were made and the proppant settling tested as described below. The carrier fluid was a mixture of a linear gel having a viscosity of about 44 cP at 511 sec$^{-1}$ and a ceramic proppant with a concentration of 480 g/l.

Figure 6:
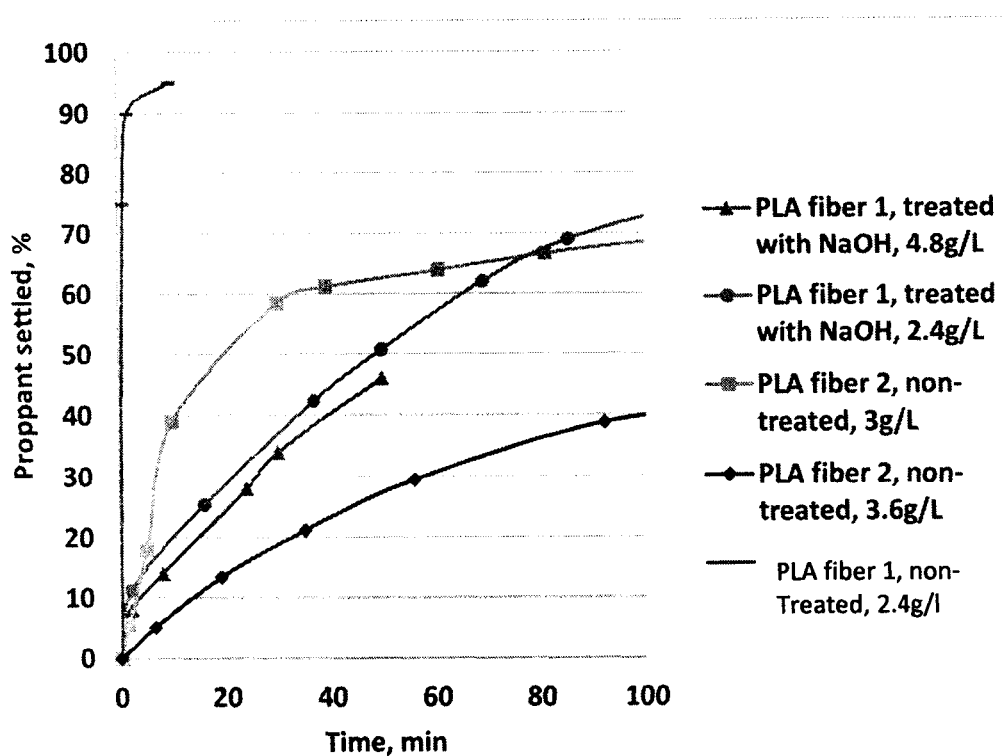
FIG. 6 shows a comparison of surface treated PLA fibers and non-surface treated PLA fibers, according to the present embodiments.

Proppant settling is the time after which 50% of the proppant is settled. The longer the time, the better the fiber performance in terms of proppant settling. The amount of proppant settling for the above described PLA fibers was calculated at various times and plotted as shown in FIG. 6. The lower the percentage of proppant settling the better. In some embodiments, due to the surface roughness, the fiber-fiber interaction (friction) may be increased and the fiber network may become more stable (strong) to sustain proppant particles in suspended state. In some embodiments, a linear proppant settling rate at a first time (about 10-15 minutes) may be compared to show the difference.

Referring to FIG. 6, untreated PLA fiber 1, i.e., without surface treatment, at a concentration of 2.4 g/L does not prevent proppant settling. After treatment with the NaOH solution, the PLA fiber 1 diameter decreased to about 8-9 microns and has good proppant prevention in different concentrations (2.4 g/L and 4.8 g/L as shown). Because fiber diameter may be an influential parameter for proppant settling performance (the less fiber diameter, the more fiber filaments in same sample weight), PLA fiber 2 having a diameter similar to that of treated PLA fiber 1 was tested. PLA fiber 2 also has a crimped surface which may provide proppant settling prevention. PLA Fiber 2 showed poor proppant settling prevention at 2.4 g/l concentration. Thus, by comparing a treated PLA fiber 1 having a similar diameter to an untreated PLA fiber 2 at the same concentration (2.4 g/l), the improvement in proppant settling prevention is due to surface treatment effect.

Thus, treated fiber may improve proppant settling at lower loadings (2.4 g/L-PLA fiber 1) which may allow for decreasing fiber loading in hydraulic fracturing technologies. Due to most fracturing fluids having an alkaline pH (ranging from about 8.5-13.5 or from about 9.5-12.5), treatment of the PLA fibers, or any fiber which may degrade in alkaline environments, the alteration of the surface may be done in situ. As a result, fiber performance may be improved in time.

Example 2

Surface roughness can also be provided by treating the fibers with organic solvents. By having highly amorphous grades of PLA (such as 6302D manufactured by Natureworks, Minnetonka, Minn.) as the sheath, the surface may be dissolved with acetone and other organic solvents (toluene, di-basic esters (DBE)). However, acetone is soluble in water. By controlling the concentration of acetone (or organic solvent), the degree of PLA dissolution may be controlled to get a desirable degree of surface roughness. The surface treatment to bi-component fibers will not affect mechanical properties of the fiber (such as, but not limited to, elongation break), because the core of the fiber may be made of a polymer that is resistant to dissolution in acetone, such as, but not limited to PLA with high degree of crystallinity. Thus, the roughness (surface defects) develops within the sheath polymer.

Figure 7A:
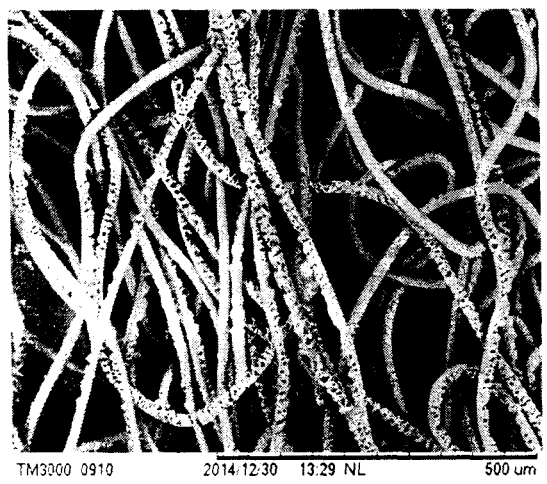
FIGS. 7A and 7B shows show scanning electron microscope photographs of surface treated bi-component PLA fibers, according to the present embodiments.
Figure 7B:

FIGS. 7A and 7B show SEM images of bi-component PLA/PLA (Type 266, manufactured by Trevira GmbH, Hattersheim, Germany) fibers with core-sheath structure having been treated with a water solution of acetone. The 266 fibers have a core of PLA (6202D) and a sheath of PLA (6302D, highly amorphous) in a ratio 50/50. The solution of acetone was 60 ml of water mixed with 100 ml of acetone. About 10 g of fibers were placed on a ceramic filter and the solution of acetone poured on the fibers with simultaneous removal of liquid phase. The time of contact was about 20-30 seconds. The fibers were then rinsed with excess water and dried in an oven at 140 degrees F.

As demonstrated by experiments on the Bridging Apparatus, the treated fibers have a higher ability to plug a slot in comparison with untreated (no finishing) fibers. The bridging apparatus is a loop where the fiber-laden suspension is pumped via a narrow slot with the width less than the fiber length. The narrow slot imitates the downhole flow conditions for a perforation opening or a narrow hydraulic fracture. In a typical fracturing job, fiber bridging is considered as undesirable event, because it increases a risk of tip screen-out. However, moderate bridging may be beneficial because it can increase a fracture complexity. According to the test procedure, a slurry of 4.8 g of fibers (treated and control) in 400 mL of linear gel (with 2.4 g/L of guar loading) was pumped sequentially through 3, 2 and 1 mm slots at different pumping rates varying from 100 to 999 mL/min. Untreated fibers passed through the 3 and 2 mm slot but plugged the 1 mm slot at a pumping rate of 500 mL/min. Fiber treated with mixture of acetone and water (having a rough surface after treatment) plugged the 2 mm slot at a pumping rate of 300 mL/min.

Example 3

Figure 8A:
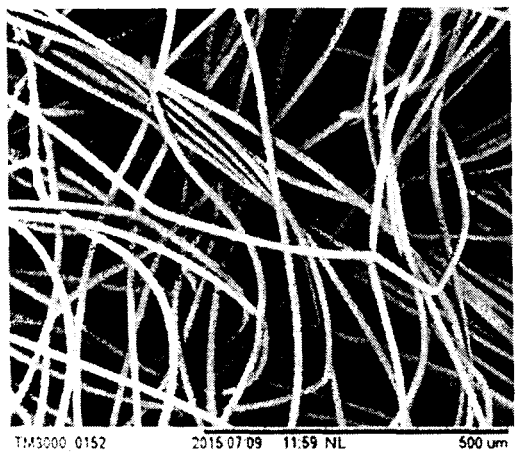
FIGS. 8A and 8B show scanning electron microscope photographs of surface treated bi-component PET/co-PET fibers, according to the present embodiments.
Figure 8B:

SEM images of bi-component PET/co-PET fibers (MELTY® (4080) manufactured by Unitika, Japan) are shown in FIGS. 8A and 8B. These fibers are manufactured to have surface roughness. The length of the fibers is about 5 mm with a diameter of about 14 microns. As demonstrated by experiments on the Bridging Apparatus, the manufactured rough fiber has higher ability to plug a fracture in comparison with untreated PET fibers with the same sizes.

Example 4

Figure 9A:
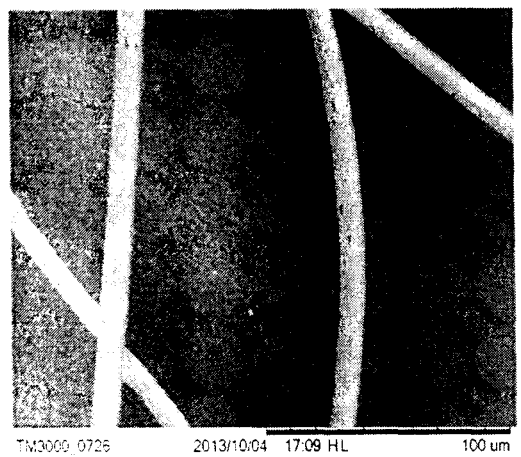
FIGS. 9A and 9B shows show scanning electron microscope photographs of surface treated bi-component PLA fibers, according to the present embodiments.
Figure 9B:
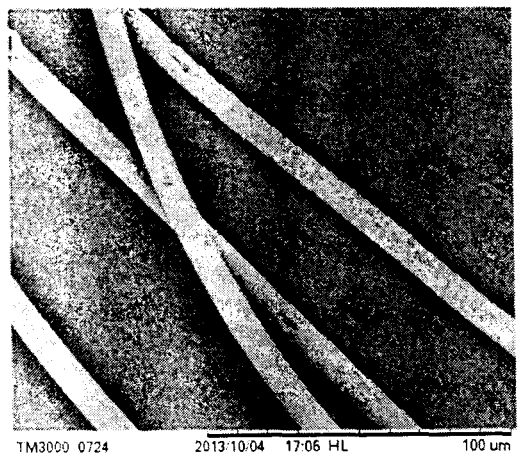
Figure 10:
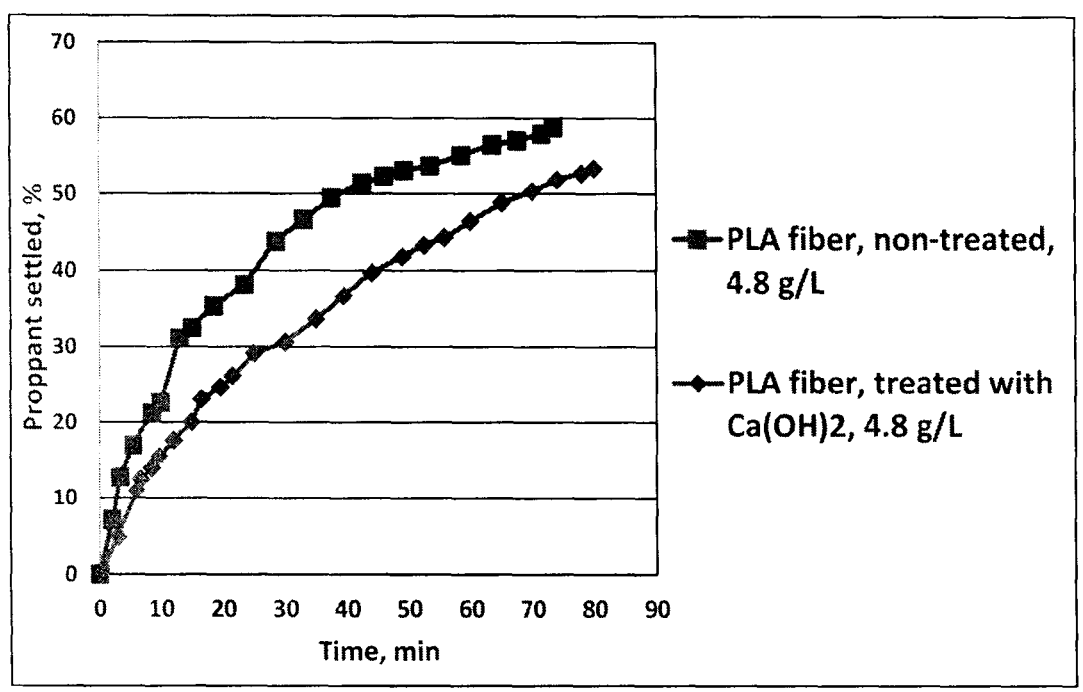
FIG. 10 shows a comparison of surface treated PLA fibers and non-surface treated PLA fibers, according to the present embodiments.

FIGS. 9A and 9B show SEM images of PLA fibers treated with granulated calcium hydroxide of 30/50 mesh size by the following procedure. 6 g of PLA fibers and 6 g $Ca(OH)_2$ were mixed with 100 mL water. After a homogeneous mixture was achieved, a liquid phase was separated from a solid phase using a syringe with 100 mesh installed at the outlet. The solid composition was oven heated at 50° C. for 5 hours. After heat-alkaline treatment, the solid was washed with HCl to dissolve $Ca(OH)_2$ and followed with a water wash until neutral pH (approximately in the pH range of from 6.5 to about 7.5). The performance of the treated fibers was compared with non-treated fibers by the proppant settling test at 4.8 g/L fiber concentration, 480 g/L proppant 12/18 concentration, using a linear gel as a base fluid (with guar loading of 5.4 g/L). As shown from the experimental data presented in FIG. 10, surface treatment (i.e., surface roughness finishing) may demonstrate a higher proppant suspension property of fiber material, i.e., the proppant settling velocity is reduced.

Embodiments of the disclosure provide fiber surface alteration or as it may also be surface finishing (including most types of etch pits, scratches, caverns, surface distortions and etc.), which may lead to improvement of fiber performance in terms of proppant settling control and fiber bridging or plugging efficiency. Improved performance may be achieved by increasing of surface roughness (roughness finishing) which may induce friction between contacting fibers. Roughness herein may be interpreted the surface of the fibers may have visible defects/imperfections such as etch pits, scratches, caverns or surface distortions with the average number ranging from about 10 defects per 1 mm of the fiber length to about 300 defects per 1 mm of the fiber length.

Embodiments of the disclosure provide alteration of the fiber surface by treating the fiber during fiber spinning process with chemicals, such as, but not limited to, organic solvents or solutions of strong bases. Alterations of the fiber surface may also be performed "in situ" due to interaction of fibers and fracturing fluid components downhole, or may be performed before mixing with the wellbore treatment fluid.

Embodiments of the disclosure also provide modification of the fiber by adjustment of one or more extrusion conditions to cause a so called "sharkskin" surface. In some embodiments, alteration of the fiber surface may be made/ initiated during fiber manufacturing process.

Thus, embodiments of the disclosure provide alteration of a fiber surface during a fiber manufacturing process, a fiber pre-treatment before fracturing job, or during pumping the fiber downhole along with a reagent. In other embodiments, the fiber surface treatment may be instituted in situ while chemical additives in a fracturing fluid interact with the fiber material during the fracturing job.

Embodiments of the present disclosure provide methods using altered fiber particles having a plurality of defects on a surface of the fibers for wellbore processes, such as proppant flowback prevention. As described above, the polymer fibers may create, under downhole conditions, a 3D fiber network that may incorporate the proppant particles.

Although only a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. A method of well treatment, comprising:
    a) injecting a slurry comprising a fibrous material, wherein the fibrous material is present in the slurry as a dispersed material, wherein the fibrous material has a plurality of defects on a surface of the fibrous material, wherein the plurality of defects are produced during manufacturing of the fibers, wherein the fibers are drawn and scratched before cutting;
    b) allowing the fibrous material to form a plug in one or more than one of a perforation, a fracture, and a wellbore in a well penetrating formation; and
    c) performing a downhole operation.

2. The method of claim 1, further comprising allowing the fibrous material to at least partially degrade after a selected duration such that the plug disappears.

3. A method for fracturing a subterranean formation, the method comprising:
    injecting a fracturing fluid into a wellbore through the subterranean formation, thereby creating a fracture network in the subterranean formation, the fracturing fluid comprising a proppant and a plurality of fibers having a plurality of defects on a surface of the fibers, wherein the plurality of defects ranges from about 10 defects/mm of fiber length to about 300 defects/mm of fiber length; and
    allowing the fracture network to close after injecting the fracturing wherein the plurality of defects are produced during manufacturing of the fibers, wherein the fibers are drawn and scratched before cutting.

4. The method of claim 3, further comprising: producing hydrocarbons from the subterranean formation into the wellbore through a proppant pack including the plurality of fibers.

5. A method for fracturing a subterranean formation, comprising:
    injecting a fracturing fluid into a wellbore through the subterranean formation, thereby creating a fracture network in the subterranean formation, the fracturing fluid comprising a proppant and a plurality of fibers;
    after pumping of the fracturing fluid has begun, adding a second fluid to the fracturing fluid to initiate formation of a plurality of defects on the surface of the fibers in situ, wherein the second fluid is an organic solvent; and
    allowing the fracture to close after injecting the fracturing fluid.

6. The method of claim 5, further comprising: producing hydrocarbons from the subterranean formation into the wellbore through a proppant pack including the plurality of fibers.

7. The method of claim 5, wherein the organic solvent comprises acetone, ethyl acetate, butyl acetate, acetonitrile, benzene, toluene, glycol ether solvents, alcohols, dibasic esters or esters of fatty acids.

\* \* \* \* \*